United States Patent
Parekh et al.

(10) Patent No.: US 7,316,728 B2
(45) Date of Patent: Jan. 8, 2008

(54) METHOD AND APPARATUS FOR TREATING FLUIDS

(75) Inventors: Bipin Parekh, Chelmsford, MA (US);
Saksatha Ly, Lexington, MA (US);
Jieh-Hwa Shyu, Andover, MA (US);
John E. Pillion, Hollis, NH (US)

(73) Assignee: Entegris, Inc., Chaska, MN (US)

( * ) Notice: Subject to any disclaimer, the term of this patent is extended or adjusted under 35 U.S.C. 154(b) by 151 days.

(21) Appl. No.: 10/559,018

(22) PCT Filed: May 27, 2003

(86) PCT No.: PCT/US04/16749

§ 371 (c)(1),
(2), (4) Date: Apr. 3, 2006

(87) PCT Pub. No.: WO2004/110602

PCT Pub. Date: Dec. 23, 2004

(65) Prior Publication Data

US 2006/0219634 A1    Oct. 5, 2006

Related U.S. Application Data

(60) Provisional application No. 60/473,962, filed on May 28, 2003.

(51) Int. Cl.
*B01D 53/22* (2006.01)
*B01D 11/00* (2006.01)
*B03C 3/00* (2006.01)
*B01D 63/00* (2006.01)

(52) U.S. Cl. .................. 95/56; 210/644; 210/321.8; 95/45; 95/47; 95/3; 94/4; 94/10

(58) Field of Classification Search ............... 210/644, 210/321.8, 195.2; 95/3, 45–56; 96/4, 10, 96/14; 134/902, 155
See application file for complete search history.

(56) References Cited

U.S. PATENT DOCUMENTS

| | | | |
|---|---|---|---|
| 5,336,601 A | | 8/1994 | Iacobucci |
| 5,714,072 A | * | 2/1998 | Reed et al. .................. 210/644 |
| 5,759,237 A | * | 6/1998 | Li et al. ......................... 95/41 |
| 5,919,285 A | * | 7/1999 | Li et al. ......................... 95/45 |
| 6,126,723 A | | 10/2000 | Drost |
| 6,754,552 B2 | * | 6/2004 | Nishiumi et al. ........... 700/121 |
| 6,866,049 B2 | * | 3/2005 | Rolfson ....................... 134/119 |
| 7,033,500 B2 | * | 4/2006 | Bomberger et al. ..... 210/321.79 |

FOREIGN PATENT DOCUMENTS

| | | |
|---|---|---|
| EP | 0 732 142 A2 | 3/1996 |
| JP | 03 218912 | 9/1991 |
| JP | 04 285897 | 10/1992 |

OTHER PUBLICATIONS

Bruno S. Ferreira, et al.; J. Chem Technol. Biotechnol. (1998), 61-67; vol. 71.

* cited by examiner

*Primary Examiner*—Ana Fortuna
(74) *Attorney, Agent, or Firm*—John E. Pillion; Timothy J. King

(57) ABSTRACT

The present invention is directed to an apparatus for combining a component from a fluid composition with a reactive fluid. The apparatus includes a hollow fiber contactor (142) having a plurality of hollow fibers contained within a housing. A reactive fluid (224), which may be on the shell or lumen side of the hollow fiber membrane, is included in the apparatus and is used for combining with a component from a fluid composition which is on the opposite side of the membrane from the reactive liquid. The reactive liquid combines with one or more components from the fluid composition and can be used for purification of the fluid composition or for the preparation of chemical reagents.

10 Claims, 3 Drawing Sheets

METHOD AND APPARATUS FOR TREATING FLUIDS

PRIORITY

This application claims the benefit of U.S. Provisional Application No. 60/473,962, filed May 28, 2003, the contents of which are incorporated herein by reference in their entirety.

BACKGROUND

Various industries require removal of contaminants from chemicals before use in subsequent processes or the removal of harmful compounds from chemical prior to discharge of an effluent. Examples of such processes include: use of purifier beds for the removal of contaminants like water vapor from silicon containing process gases used in fiber optic manufacturing; use of dry trains for the removal of unwanted gases like water and oxygen from the re-circulated gas in a closed system such as a glove box; use of a purifier bed for the removal of gases such as amines from the re-circulated environmental gas from a track or photoresist processing cleanroom; and, use of wet scrubbers for the removal of corrosive gases such as ammonia and hydrochloric acid from process gases used in the manufacture of semiconductor wafers.

In many such purification or effluent scrubbing applications the bed is either replaced when its capacity is used up or the bed is regenerated in a separate process that usually requires heating and use of a purge gas. In either case a second purification or scrubbing apparatus is required to maintain continuous process capability or the process is stopped while the purifier is replaced or regenerated.

In dry scrubbers, solid supports such as carbon particles, extruded pellets of iron oxides, copper oxide, alumina, or silica which are reactive with or are impregnated with a reactive chemical reagents designed to remove from a fluid stream gaseous contaminants like HCl, HF, amines, NMP, $Cl_2$, $PH_3$, $SiH_4$ etc. The solid supports are placed in a container or may be bound onto a solid support or membrane. When the capacity of the reagent in the container or on the support is consumed by the contaminant a monitoring device indicates the endpoint capacity of the reactive material. The process is stopped, the used material removed, and a new vessel containing contamination removing material is added.

The reaction reagents of the support or in the support with the contaminant are limited by diffusion. Once the outer portion of the reagent is reacted further reaction is limited by diffusion of contaminant from the outside to the inside of the particle where fresh reactive chemical is present. This diffusion necessitates the use of large volumes of material to efficiently increase gas residence time and prevent premature breakthrough. Typical scrubber beds have a large volume,—55 gallons, which results in a large footprint in the lab. The large volume of the scrubber canisters also leads to a high cost for the waste disposal of the material.

Contamination removal by small meshed particles impregnated with reactive chemical can be a source of particulate contamination. This often necessitates a secondary filter or the manufacture of asymmetric support membranes with smaller pore size than the particles to prevent their loss. This increases the costs of the membrane. Small pore sizes to prevent impregnated particle loss leads to increased pressure drop of gas through the membrane and requires more costly pumps and air handling equipment.

Open beds of reactive material have lower pressure drop but are less efficient at removing contaminants from a gas stream than reactive chemical impregnated in a support particle embedded in a membrane.

It is inconvenient to stop a process to remove the waste or contamination reducing apparatus. Furthermore, endpoint sensors can fail and channeling of the contamination removal beds can occur leading to premature breakthrough.

In effluent scrubbing the wet scrubbers are large footprint devices holding large volumes of water, pumps, Raschig rings and or sprayers to increase mixing and contact area between the effluent gas and the scrubbing liquid.

Sensor located in the scrubber bed give the best indication of breakthrough and permit changeout of the scrubber before breakthrough occurs. However the sensor is typically discarded with the bed which is costly. The types of sensors used in a dry bed is limited. When the sensor is located after the scrubber bed the sensor can be recovered, but breakthrough can occur because the sensor detects only when the bed is exhausted. Breakthrough of the bed can be anticipated and the bed removed prior to consumption, but this leads to inefficient use of the capacity of the scrubber bed and higher costs for bed materials and waste disposal. Undetected breakthrough of the bed can cause product loss or environmental release of toxic gases.

It would be desirable to have a small footprint device useful for the concentration of fluids or removal of contaminants or harmful effluent from fluids to be used in various manufacturing processes and environmental enclosures. It would be further desirable if the purification device were simple to regenerate and enabled continuous processing to occur. It would be further desirable if the device could be used with a wide variety of purification or scrubbing media and reduce the volume of waste generated. There is a need to reduce the volume of chemical waste generated by contamination removal beds and to reduce the size of equipment required for such removal. It would be desirable to improve the mass transfer of contaminants from the gas to the chemically reactive media without increasing the pressure drop of the gas through the bed. It would be desirable to prevent channeling and premature breakthrough of the removal bed or media and to extend the life of the bed to reduce changeout frequency.

SUMMARY

One embodiment of the present invention is directed to an apparatus for combining a component from a fluid composition with a reactive fluid. The apparatus includes a hollow fiber contactor having a plurality of hollow fibers contained within a housing. The hollow fibers have a lumen side and a shell side separated by a porous membrane with the lumen side of the hollow fibers in fluid communication with an inlet and outlet of the housing and the shell side of said hollow fibers in fluid communication with a separate fluid inlet and outlet of the housing. A reactive fluid, which may be on the shell or lumen side of the hollow fiber membrane, is included in the apparatus and is used for combining with a component from a fluid composition which is on the opposite side of the membrane from the reactive liquid. The reactive liquid combines with one or more components from the fluid composition; after combining the reactive fluid with the added component may be used for further chemical processes in a reactor or for suitable discharge.

One embodiment of the present invention is directed to an apparatus for removing a impurities from a fluid. The apparatus includes a hollow fiber contactor having a plurality of hollow fibers contained within a housing. The hollow fibers have a lumen side and a shell side separated by a porous membrane with the lumen side of the hollow fibers in fluid communication with an inlet and outlet of the housing and the shell side of said hollow fibers in fluid communication with a separate fluid inlet and outlet of the housing. A reactive fluid, which may be on the shell or lumen side of the hollow fiber membrane, is included in the apparatus and is used for removing a component from a fluid composition which is on the opposite side of the membrane from the reactive liquid. The reactive liquid removes the component from the fluid and the fluid is used for further chemical processes in a reactor or for suitable discharge.

The high surface area and enhanced mass transfer of the hollow fiber device enables a small footprint device for purification or scrubbing applications of a variety of fluids. Embodiments of the present invention may be made with chemically and thermally inert materials of construction such as PFA and MFA which permits use of the apparatus in a wide variety of process fluids and temperatures.

In another embodiment, the apparatus may also include a reservoir of reactive fluid that is in fluid communication with one side of the membrane of the hollow fiber contactor. The reactive fluid may be metered through the hollow fiber contactor to maintain a constant chemical composition within the hollow fiber contactor for removing an impurity or harmful effluent from the fluid. The apparatus may further include a re-circulating pump in fluid communication with the reactive fluid reservoir for re-circulating the reactive fluid through the hollow fiber contactor. The reservoir may be periodically bled of reactive fluid, which is disposed of according to local requirements, and may be replaced with fresh reactive fluid so that the efficiency of the purification and scrubbing process is maintained without interruption to the process. In-line chemical sensors may be included in the reactive fluid reservoir as well as for monitoring the composition of the purified or scrubbed fluid. The liquid and gas side properties may also be monitored to determine the gas transfer efficiency.

Another embodiment of the present invention is an apparatus for purifying fluids that includes a source of fluid comprising impurities and a hollow fiber membrane contactor having an inlet in-line with said impurity comprising fluid. The apparatus include a reactive fluid separated from the impurity comprising fluid by the porous hollow fiber membrane of the contactor. The reactive fluid reacting with at least one component of the impurity comprising fluid, with the impurities from the impurity comprising fluid preferentially concentrating in the reactive fluid. The hollow fiber contactor includes an outlet for withdrawing a portion of said purified fluid.

Another embodiment of the present invention is a method for combining a fluid composition with a reactive fluid including the acts of providing a fluid composition and combining it with a reactive fluid separated from the fluid composition by a plurality of porous hollow fiber membranes in a hollow fiber contactor. Combining a component of the fluid composition with the reactive liquid may be used to purify the fluid composition by removing impurities from the fluid composition. Alternatively one or more components from the fluid composition may be concentrated or reacted with the reactive fluid for preparation of useful reagents. The method may further include the act of re-circulating the reactive fluid through the hollow fiber contactor as well as the act of maintaining the composition of the reactive liquid by feeding and bleeding a portion of the reactive fluid flowing through said hollow fiber contactor and replacing it with unused reactive fluid.

The hollow fiber membrane contactor allow high transfer rates of gas in liquids, offer much smaller footprint , rapid start up of the contacting process, and superior material compatibility. This should offer the practitioner a more efficient contactor at lower cost-of-ownership.

The present invention relates to a method and apparatus for the purification of gases for which may be used in chemical processes or which may be part of an effluent stream. In particular, the present invention provides a purification process where a fluid is purified by reacting a component of the fluid with a reactive liquid, gel, or slurry contained on one side of a porous hollow fiber membrane.

One embodiment of the present invention is a hollow fiber device containing a plurality of hollow fibers filled with a chemically reactive liquid. Each hollow fiber in the device is filled with a chemically reactive liquid and acts as a large surface area and high capacity absorbent particle. The hollow fiber membrane is both a support and source of reactive material. The advantage is that high removal and a low pressure drop can be achieved because gas flow does not occur through the membrane. Another advantage is that the potential for particle generation by an open bed or by supported particles in a membrane is eliminated.

The hollow fiber device filled with the reactive liquid can have fluid valves on its inlet and the outlet and is in communication with a reservoir of additional reactive liquid through a pump as schematically illustrated in FIG. 1. By re-circulating the reactive liquid through the hollow fibers and into a vessel several advantages of the invention are achieved. First mixing of the liquid by the pump improves mass transfer of gas into the reactive liquid across the membrane. Secondly, the reservoir provides an essentially constant source of fresh reactant liquid to the fiber (unlike the case of reagent impregnated into a solid). The maximum capacity of the reagent is used in this configuration unlike solid reactant particles which are limited by diffusion. The valves allow the hollow fiber device to be temporarily closed and the reactive liquid replaced with fresh reactive liquid without interruption of the process due to the reacting capacity of the liquid contained within the fibers. This gives the invention a virtually unlimited capacity unlike solid beds.

The reservoir can contain a monitoring device for detecting the concentration of species in the liquid reservoir. The monitor can be used to indicate when the capacity of the reactive liquid or slurry. The monitor can be chromatographic, electrochemical, optical, mass spectroscopic, calorimetric or chemiluminescent etc. It is unnecessary to mount the endpoint sensor in a bed of solid materials since the liquid in the reservoir is well mixed and everywhere within the tank is equivalent for monitoring. This is an advantage because it permits accurate sampling of the reactive liquid and reduces the costs of sensors which would normally be disposed of.

DESCRIPTION OF THE DRAWINGS

In part, other aspects, features, benefits and advantages of the embodiments of the present invention will be apparent with regard to the following description, appended claims and accompanying drawings where:

DETAILED DESCRIPTION

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "hollow fiber" is a reference to one or more hollow fibers and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

Figure 1:
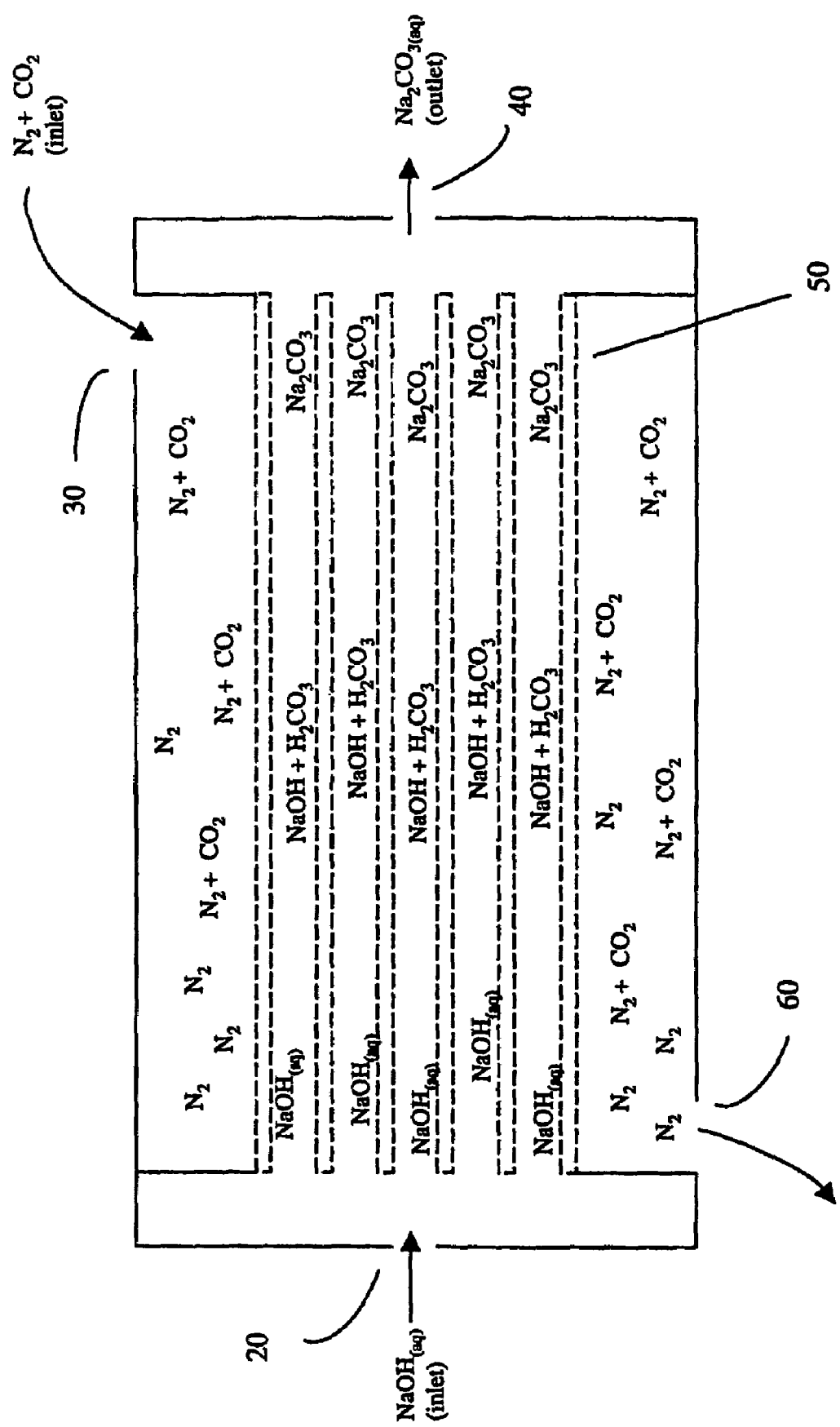
FIG. 1 is a schematic diagram of a contactor of the present invention for removing impurities from a fluid.

Embodiments of the present invention are directed to an apparatus for removing a impurities from a fluid. The apparatus includes a hollow fiber contactor having a plurality of hollow fibers contained within a housing as shown in FIG. 1. The hollow fibers 50 have a lumen side and a shell side separated by a porous membrane with the lumen side of the hollow fibers in fluid communication with an inlet 20 and outlet 40 of the housing and the shell side of said hollow fibers in fluid communication with a separate fluid inlet 30 and outlet 60 of the housing. Examples of hollow fiber contactors useful in the practice of the present invention include but are not limited to those made by Liqui Cel, W L Gore, Nitto Denko, and the Phasor, Mykrolis Corporation, Billerica, Mass. The hollow fibers may be made from chemically compatible materials of construction including but not limited to polyethylene, polymethylpentene, and polytetrafluoroethylene. Preferably the hollow fibers are made from Teflon PFA® which is an example of a poly (tetrafluoroethylene-co-perfluoro(alkylvinylether)) in which the alkyl is primarily or completely the propyl group, FEP Teflon® which is an example of poly(tetrafluoroethylene-co-hexafluoropropylene), or the polymer made by the copolymerization of tetrafluoroethylene and perfluoromethyl vinylether to form Hyflon® MFA. Preferably the hollow fiber contactor is made by the methods and materials disclosed in WO 00/44479 the contents of which are incorportated herein by reference in their entirety.

Fiber diameters can range from 100-1000 um in diameter. Well thickness should be minimized and preferred thickness is 25-250 um. Hollow fiber beds can consist of mats of fibers with thickness ranging from 1-25 cm in depth and length and width of 10-100 cm. The beds can be circular with diameters of 1-25 cm and lengths of 20-300 cm and contain multiple baffles to distribute gas throughout the bed of fibers. Hollow fibers in the contactor may be straight or can be loosely packed.

Baffles are useful in the practice of the present invention for enhancing the mixing and distribution of fluids on either side of the hollow fiber membrane (not shown in FIG. 1). The hollow fiber contactor can be used in a single pass mode or in a re-circulating mode for either or both the reactive fluid and fluid composition to be purified. Preferably the contactor is provided with two or more fluid ports or fittings on the shell and lumen side of the housing. Usually one port serves as a fluid inlet and the second serves as a fluid outlet. The ports or fluid connections on the shell side of the contactor are separated from the lumen side inlet and outlet port by the fiber membrane. Preferably the reactive fluid and the fluid composition with the impurity flow counter current to each other as illustrated in FIG. 1; more preferably the fluid flowd in a manner which maximizes a cross flow of the fluids with respect to one another.

The reactive fluid used in the present invention may be on the shell or lumen side of the hollow fiber membrane. The reactive fluid is used for combining with a component from a fluid composition. The component from the fluid composition that is removed may be an impurity or it may be a chemical that is added to the reactive fluid to form a fluid product. The reactive fluid may include a gas, a liquid, or a liquid including a slurry of solid material. The chemical composition of the reactive liquid is chosen so that it reacts or concentrates the component from the fluid composition into the reactive liquid. Reactive liquids can include water, aqueous alkaline solutions, aqueous acid solutions, aqueous reducing solutions and aqueous oxidizing solutions. Slurries of reactive particles like FeOOH and CuO suspended liquids can also be used.

For example the reactive liquid may include water with hydrochloric acid gas or an organic sulfonic acid dissolved in the water. This reactive fluid can be used for combining with and removing ammonia vapors from a source of air to be used in a cleanroom. The reactive liquid may include a metal hydroxide base like sodium hydroxide, organic amines such as butyl amine or mono ethanol amine for removing acid gases, for example but not limited to HCl, HBr, and $H_2CO_3$ from the gaseous effluent of a metal etch process or for removing trace gases such as $CO_2$ or $H_2S$ from natural gas. FIG. 1 illustrates the removal of $CO_2$ from a mixture of gases like air inlet at 30 and flowing counter current to the reactive fluid NaOH inlet to the contactor at 20. The $CO_2$ reacts with the water and NaOH within the fibers to form $Na_2CO_3$ and effectively removes the $CO_2$ from the gas mixture. Low vapor pressure liquids such as sulfuric acid can be used as a desiccant liquid or to remove gases like ammonia. A reactive slurry can include particles too large to foul the membrane but which can be used to increase the capacity of the reactive liquid or facilitate its reconditioning. For example, a slurry including zirconium hydrogen phosphate as a suspension would be useful for removing amines from a gas; the reacted particles in the slurry may be removed by filtration and replaced with un-reacted zirconium hydrogen phosphate. The reactive fluid can also be a liquid such as water. The water in the contactor can combined with a gas mixture like HCl and nitrogen to make a fluid product that in this case is an aqueous acid solution.

Figure 3:
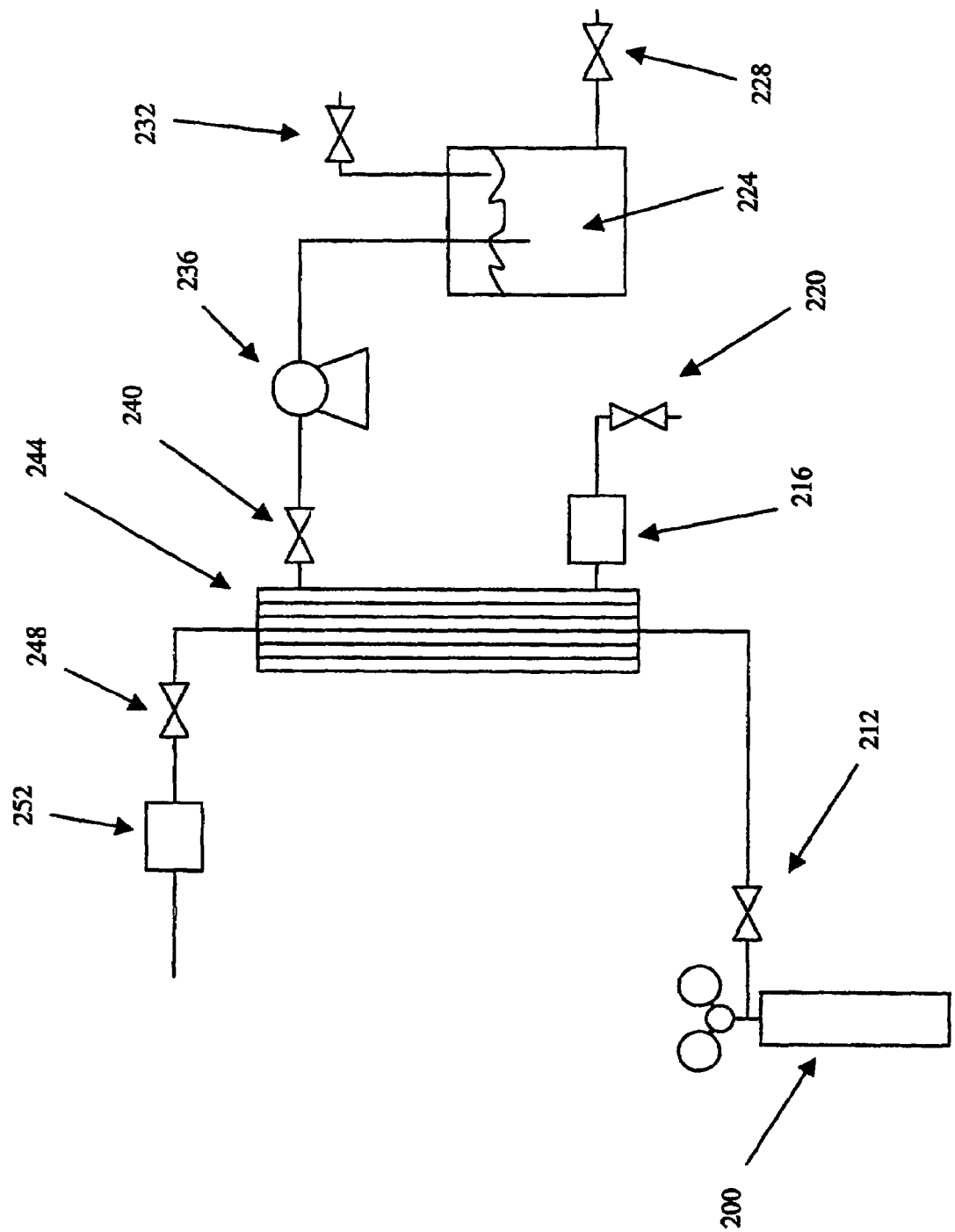
FIG. 3 is a schematic diagram of a contactor and reactive fluid for combining a fluid composition with the reactive fluid.

The temperature of the reactive liquid or the fluid composition may be adjusted to increase reactivity or increase the concentration of a component from the fluid composition in the reactive liquid. For gases which are soluble in the reactive liquid, decreasing the temperature of the liquid would be desirable to increase the solubility of a gaseous impurity or fluid component in the reactive liquid. The reactive fluid can be used to remove a portion of the impurity from the fluid composition so that the fluid composition can be used in further chemical processes or discharged. Alternatively a component from the fluid composition combines with the reactive fluid to form a product fluid which may be used for further chemical processing. For example, as shown in FIG. 3, a source of fluid 200 is contacted through contactor 244 with reactive fluid 224. The newly formed product fluid from this combination may be monitored by sensor 216 and withdrawn through valve 220. In the case of impurity removal, the amount of impurity that is required to be removed from the fluid composition will depend upon the application as well as the concentration of impurities and reactive fluid. Flow rates for the two fluids as well as contactor size will influence impurity removal. For example, one skilled in the art would be able to increase the size of the contactor, the number of fibers, or alter the temperature and or concentration of reactive fluid to suit the needs of the application using known chemical and chemical engineering principles.

The fluid composition, which may include an impurity component or a component to be combined with the reactive fluid, is separated from the reactive liquid by the porous hollow fiber membrane. The fluid composition may be on the shell or lumen side of the hollow fiber contactor and enters the contactor through an inlet fitting. The fluid composition may be a vapor or gas and may be at a positive pressure with respect to the reactive fluid or it may be at a lower pressure than the reactive fluid. The impurity or component in the fluid composition can condense, dissolve, or chemically react with the reactive liquid thereby decreasing the amount of impurity or component in the fluid composition. In the case of an impurity, the fluid composition with the reduced impurity content is removed from the hollow fiber contactor through an outlet fitting and is used for further chemical processes in a reactor or for suitable discharge. Flow of the fluid composition may be counter current to the reactive fluid, preferably the flow is in a cross flow with respect to the reactive fluid. The flow rate and pressure of the fluid composition flowing through the hollow fiber contactor is controlled using methods known to those skilled in the art.

Figure 2:
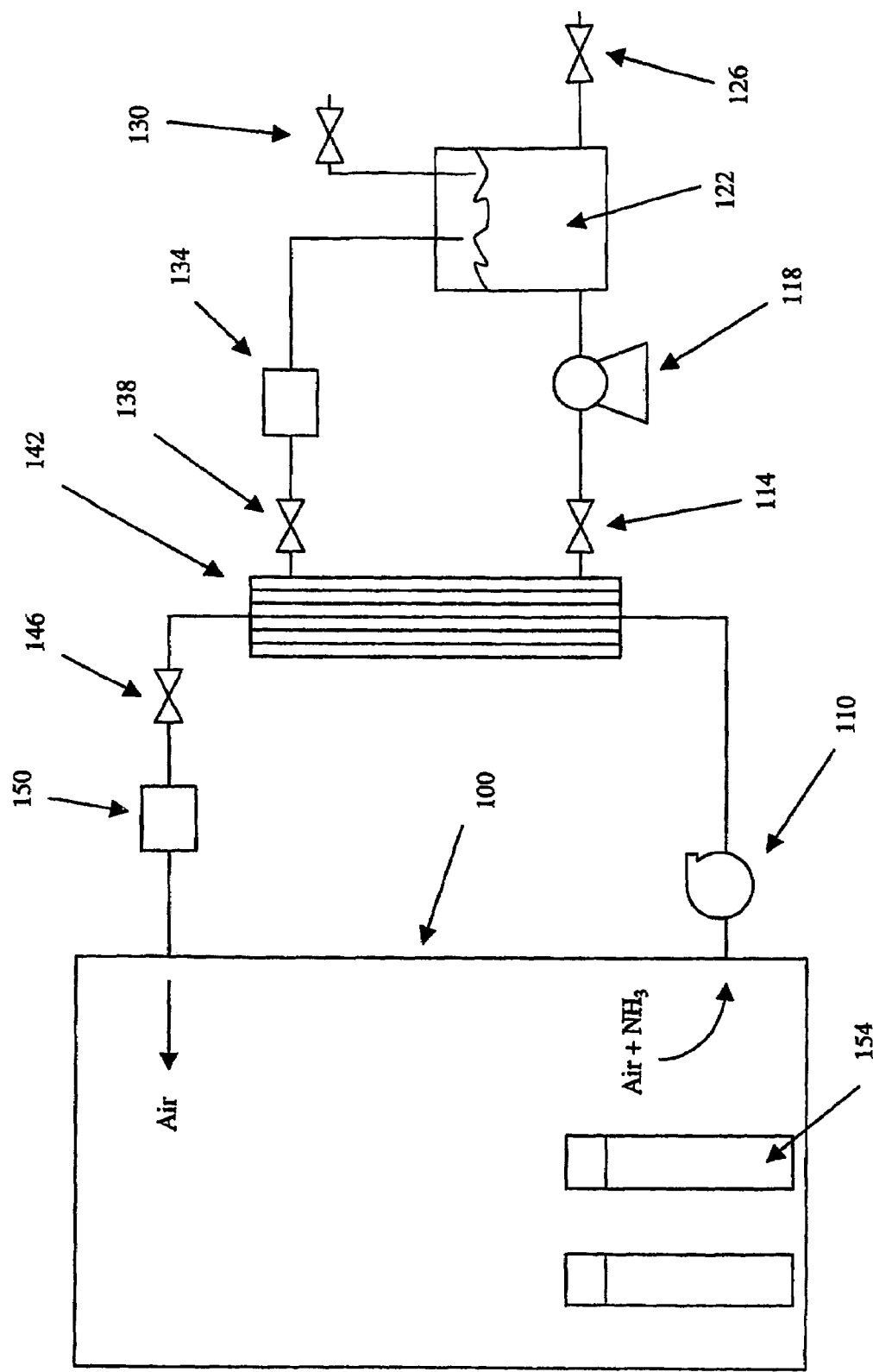
FIG. 2 is a schematic diagram of a contactor of the present invention for removing impurities from a fluid including a re-circulating pump and reactive fluid reservoir.

A reservoir of reactive fluid 122 that is in fluid communication with an inlet port of the hollow fiber contactor 142 can be metered through the hollow fiber contactor to maintain the chemical composition and reactivity of the reactive fluid within the hollow fiber contactor for removing an impurity or harmful effluent from the fluid composition. Reactive fluid which has been consumed can be collected at the outlet of the hollow fiber contactor and disposed of or regenerated by an offline process (not shown in FIG. 2). Valves 114 and 138 can be used to isolated the contactor from the fluid reservoir for single pass application of the reactive fluid through the contactor. The reservoir 122 can have an inlet so the apparatus may include a re-circulating pump 118 in fluid communication with the reactive fluid reservoir 122 or re-circulating the reactive fluid through the hollow fiber contactor 142. The reservoir can be periodically bled of reactive fluid through valve 126, which is disposed of according to local requirements or regenerated off-line, and the discarded fluid replaced with fresh reactive fluid through valve 130 so that the efficiency of the purification and scrubbing process is maintained without interruption to the process.

In-line chemical, temperature or flow sensors 134 may be included in the reactive fluid reservoir or flow path for monitoring the composition of the reactive fluid. The fluid composition 150 into and out of the hollow fiber contactor can also be monitored with suitable sensors. The fluid composition from a source such as an environmental enclosure 100 with equipment 154 can be fed using a pump 110 to feed the fluid composition (Air and $NH_3$) into the contactor 142 where it is reacted with the reactive liquid and returned a clean air. Valve 146 may be used to isolate or stop the flow of gas through the contactor. A control loop for feeding and bleeding the reactive fluid into and from the hollow fiber contactor or reservoir (not shown) may be based on the inputs from the various sensors as would be known to those skilled in the art. For example, when the pH of a reservoir with an aqueous solution of a base decreases below a value set by the operator, the reservoir is opened to release a volume of the used reactive fluid and a container with fresh reactive solution is opened to replenish the volume of reactive fluid in the reservoir. The flow rate of the reactive fluid as well as the fluid composition flow rate can be adjusted as well to maximize the mass transfer efficiency of the apparatus based upon the amount of impurity in the fluid composition.

Purifying a fluid composition with impurities includes the steps or acts of providing a source of the fluid composition having impurities and contacting it with a reactive liquid separated from the impure fluid composition by a plurality of porous hollow fiber membranes in a hollow fiber contactor. The method further includes combining, concentrating, dissolving, or condensing the impurity from the fluid composition with the reactive fluid. The liquid composition with a portion of the impurity removed is withdrawn from the contactor for further chemical processing or environmental maintenance. The method may further include the act of re-circulating the reactive fluid through the hollow fiber contactor as well as the act of maintaining the composition of the reactive liquid by feeding and bleeding a portion of the reactive fluid flowing through the hollow fiber contactor and replacing it with unused reactive fluid.

The removal of an impurity from a fluid composition or the amount of combination of a fluid component with a reactive liquid may be determined using sensors known to those skilled in the art. For example FTIR spectroscopy with a gas cell is useful for measuring gas concentration to part per billion levels for gaseous species such as water, HCl, $CO_2$ as well as others in effluent gas streams. Liquid chromatography, mass spectroscopy, as well as conventional pH sensors may be used to measure the incorporation of a gas like HCl or ammonia into liquids down to part per billion levels. Where necessary the liquids may be concentrated prior to their analysis.

The hollow fiber membrane contactor allow high transfer rates of gas in liquids, offer much smaller footprint, rapid start up of the contacting process, and superior material compatibility. This should offer the practitioner a more efficient contactor at lower cost-of-ownership. Applications of the contamination removal device embodiment of the present invention include placement before or after vacuum pumps on etch and physical vapor deposition tools. Such device could be placed at the outlet of a chemical vapor deposition tool and in one embodiment could be used to selectively remove noble metal reagents like platinum from the exhaust gas for reclaim and recovery. In another application the contamination removing device could be used in an air stream in an air handling device to remove trace contaminants like amines from clearnroom air. The contactor can be used to acidify fluids to form an acidic fluid product by combining a reactive fluid with a gas mixture that includes an acid forming component. Alternately the contactor may be used to form a base in a reactive fluid by using a gas mixture that includes a component like ammonia.

The present invention relates to a method and apparatus for the purification of gases for which may be used in chemical processes or which may be part of an effluent stream. In particular, the present invention provides a purification process where a fluid is purified by reacting a component of the fluid with a reactive liquid, gel, or slurry contained on one side of a porous hollow fiber membrane.

EXAMPLE 1

Table 1 shows the results of using water as a scrubbing fluid for removal of $CO_2$ removal from an air and oxygen mixtures:

TABLE 1

| Water Flow (gpm) | $CO_2$ flow (l/min) | $O_2$ flow (l/min) | Resistivity In (M-ohm) | Resitivity Out (K-ohm) |
|---|---|---|---|---|
| 1 | 1.5 | 1.5 | 17.3 | 43 |
| 5 | 1.5 | 1.5 | 17.3 | 87.8 |
| 1 | 0.3 | 2.7 | 17.3 | 104 |
| 5 | 0.3 | 2.7 | 17.3 | 240 |
| 1 | 1.021 | 5 | 17.3 | 68.5 |
| 2 | 1.021 | 5 | 17.3 | 87.5 |
| 3 | 1.021 | 5 | 17.3 | 108 |
| 4 | 1.021 | 5 | 17.3 | 129 |
| 5 | 1.021 | 5 | 17.3 | 152 |

The results shown that water removes $CO_2$ from the air to form carbonic acid in the water resulting in a decrease in the resisitivity of the water.

EXAMPLE 2

Setup manifold to evaluate hollow fiber with reactive chemical as gas scrubber for vacuum processes. Use carbon dioxide in air as test gas and aqueous NaOH as reactive chemical for removing $CO_2$ from air. Installed non-dispersive infrared sensor, 0-1600 ppm $CO_2$ detection range, to monitor $CO_2$ removal from room gas stream. Non-dispersive sensor outlet is connected to a GAST pump which draws air through the inlet on the shell side of the contactor, across the fibers containing the aqueous NaOH, out of the outlet of the contactor and through the non-dispersive $CO_2$ detector. Air flow through the contactor was controlled with a 0-5 slpm mass flow controller. With aqueous NaOH liquid flow inside ozone contactor hollow fiber lumen and ~520 ppm $CO_2$ feed challenge, $CO_2$ removal efficiency ranged from 70% at 5 slpm total gas flow to 96% at 100 sccm total gas flow through the contactor.

A contactor was setup with an aqueous solution pH 12-14 of NaOH, flowing 280 cc/min re-circulation with Teflon gear pump and 0.5 liter PFA vessel for containing the NaOH, outside the contactor hollow fiber lumen. An air challenge of ~520 ppm $CO_2$ was feed through the lumen of the fibers. $CO_2$ removal from the air was essentially quanitative (100%—at detection limit of $CO_2$ analyzer) at air challenge flow rates up to about 2 slpm; 93% $CO_2$ removal observed at 5 slpm air flow through the contactor with the NaOH scrubbing solution.

Although the present invention has been described in considerable detail with reference to certain preferred embodiments thereof, other versions are possible. For example the same apparatus may be used to generate a gas or vapor by contacting the fluid composition with the reactive liquid. Therefore the spirit and scope of the appended claims should not be limited to the description and the preferred versions contain within this specification.

What is claimed:

1. An apparatus comprising:
   a hollow fiber contactor having a plurality of hollow fiber membranes contained within a housing; said hollow fibers having a lumen side and shell side separated by a porous membrane, said lumen side of said fibers in fluid communication with a first inlet and a first outlet of said housing, and said shell side in fluid communication with a second inlet and a second outlet of said housing;
   said first or second inlet in-line with a source of gas comprising an impurity from an outlet of an etch tool, an outlet of a deposition tool, or a feed from a recirculated glove box or a photoresist cleanrooms,
   said hollow fiber contactor connected to a reactive fluid from a reactive fluid reservoir to direct the reactive fluid at the opposite hollow fiber membrane side, to form a gas with a reduce impurity content;
   one of said first outlet or said second outlet from said hollow fiber contactor for removing said gas with reduced impurity content and one of the first or second outlets for removing the reactive fluid; and
   a sensor to monitor the composition of gas with reduced impurity content removed from said hollow fiber contactor.

2. The apparatus of claim 1 further comprising a pump in fluid communication with said reactive fluid reservoir to re-circulate said reactive fluid through said hollow fiber contactor.

3. The apparatus of claim 1 further comprising a valve to bleed used reactive fluid from the reservoir and a valve to replenish reactive fluid in the reservoir.

4. A method for purifying a fluid comprising the steps of:
   providing a source of gas comprising an impurity from an outlet of an etch tool, from an outlet of a deposition tool, or a feed from a recirculation photoresist cleanroom air to an inlet of a hollow fiber contactor;
   said contactor having a plurality of hollow fiber membranes within a housing, the hollow fibers having a bore side and a shell side separated by a porous membrane, an inlet and outlet in communication with the shell side, and an inlet and outlet in communication with the bore side;
   contacting the gas with one of said membrane sides through one of said inlets;
   contacting an opposite membrane side with a reactive fluid separated to separate impurities from said gas through the porous hollow fiber membranes to form a gas reduced in impurity content; and removing said gas with reduced impurity content from an outlet of the hollow fiber contactor, and the reactive fluid from a second outlet;
   recirculating the gas back to the source and through said hollow fiber contactor; and monitoring said gas with reduced impurity content from an outlet of the hollow fiber contactor.

5. The method of claim 4 further comprising the step of re-circulating said reactive fluid through said hollow fiber contactor from a reactive fluid reservoir.

6. The method of claim 4 further comprising the step of maintaining the composition of the reactive fluid by releasing a volume of used reactive fluid from the reservoir and replenishing the reservoir with a volume of fresh reactive fluid.

7. The method of claim 6 further comprising the step of monitoring said reactive fluid re-circulating through said hollow fiber contactor.

8. The method of claim 4 further comprising the step of recovering noble metals from the gas.

9. The method of claim 4 where the gas is from a chemical vapor deposition tool.

10. The method of claim 4 where the contactor is placed before or after a vacuum pump on said tool.

* * * * *